United States Patent Office 3,342,808
Patented Sept. 19, 1967

3,342,808
6-AZA-5,7-CYCLOCHOLESTANOL AND SELECTED DERIVATIVES
Richard M. Scribner, Wilmington, Del., assignor to E. I. du Pont de Nemours and Company, Wilmington, Del., a corporation of Delaware
No Drawing. Filed Dec. 14, 1964, Ser. No. 418,259
6 Claims. (Cl. 260—239)

This invention relates to, and has as its principal object, provision of a new class of steroids having the 5,7-cyclocholestane structure.

The new steroids of this invention are derivatives of 6-aza-5,7-cyclocholestane represented by one of the formulas

I.

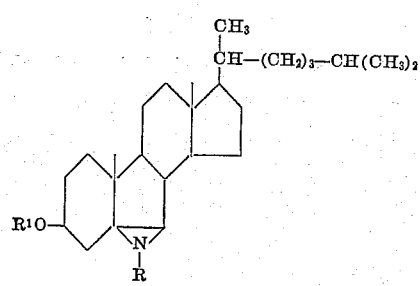

where R is hydrogen, lower alkyl or cyano and $R^1$ is hydrogen or the acyl radical of a lower alkanoic acid; and

II.

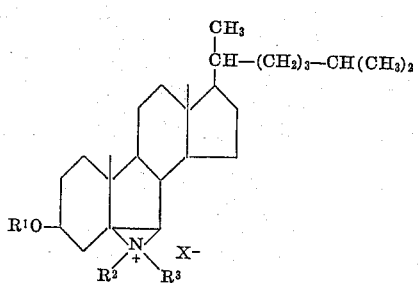

where $R^1$ is as above, $R^2$ is lower alkyl, $R^3$ is hydrogen or lower alkyl and X is the conjugate base of a strong inorganic acid.

Some derivatives of 5,7-cyclocholestanes have been described in recent publications [Petersen, J. Am. Chem. Soc. 82, 3677 (1960); Summers, Proc. Chem. Soc., 1960, 24] but no 6-aza-5,7-cyclosteroid has been reported heretofore.

The steroidal starting material in the preparation of the compounds of this invention is B-nor-cholesterol,

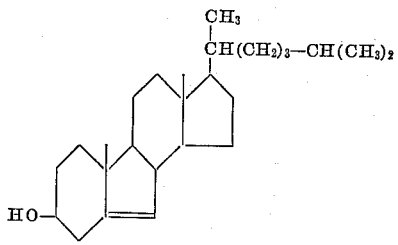

or one of its low alkanoic acid esters, e.g., B-nor-cholesteryl acetate, which can be prepared by the method of Dauben and Fonken, J. Am. Chem. Soc., 78, 3746 (1956). Upon treatment with cyanogen azide in an inert solvent at moderate temperature, e.g., 40–75° C., reaction takes place at the double bond with formation of N-cyano-6-aza-5,7-cholestan-3β-ol (or ester thereof) in accordance with the equation:

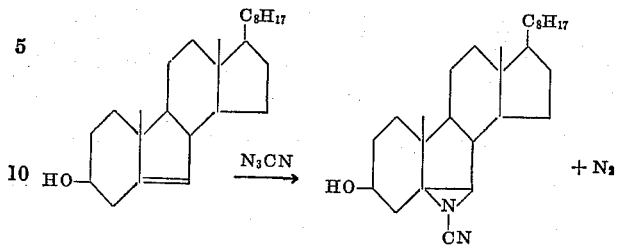

Other products of this invention are prepared from N-cyano-6-aza-5,7-cyclocholestan-3β-ol- by the following method:

Reduction with an alkali metal aluminum hydride such as sodium, potassium or lithium aluminum hydride, preferably the last named, at a temperature in the range of about 0–100° C. in an inert, non-hydroxylic solvent such as diethyl ether, di-n-butyl ether, ethyleneglycol dimethyl ether, dioxane or tetrahydrofuran, followed by treatment with water, gives 6-aza-5,7-cyclocholestan-3β-ol in accordance with the equation:

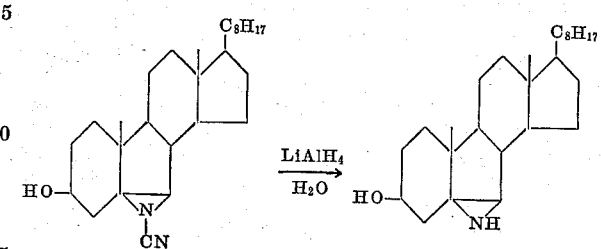

Treatment of 6-aza-5,7-cyclocholestan-3β-ol with a lower alkyl halide in an inert solvent such as an aliphatic or aromatic hydrocarbon gives a quaternary amine salt of the type

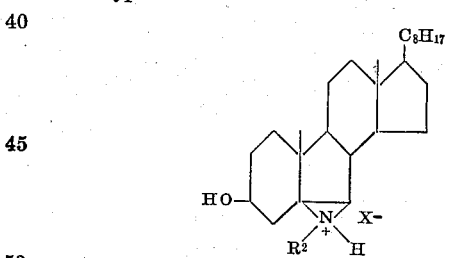

wherein $R^2$ is a lower alkyl radical such as methyl, ethyl, propyl, isopropyl, n-butyl, sec.-butyl, n-amyl, n-hexyl, etc., and X is the halide anion. By conventional metathetical reactions, the halide anion can be replaced by the anion of other strong inorganic acids, such as sulfuric or nitric acid, so that the anion X can be defined as the anion, or conjugate base, of a strong inorganic acid.

Upon treatment with an inorganic base, preferably an alkali metal (sodium or potassium) carbonate or hydroxide, or by passage over alkaline alumina, the quaternary amine salt is converted to the corresponding N-alkyl-6-aza-5,7-cyclocholestan-3β-ol:

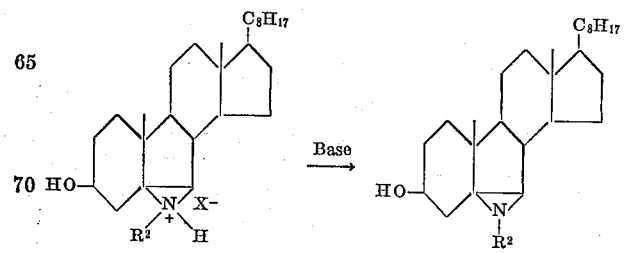

This reaction is conducted in a liquid medium which may be aqueous but preferably is a substantially water-free, inert organic liquid which is a solvent for the reaction product, such as acetone, dioxane, tetrahydrofuran, di-n-butyl ether, methanol, ethanol, and the like. The reaction is conveniently carried out at or near room temperature, i.e., in the range 10–30° C., but moderate heating, e.g., up to 50–75° C., can be applied if desired.

Other products of this invention are obtained by additional reactions using conventional methods. For example, an N-alkyl-6-aza-5,7-cyclocholestan-3β-ol of the type shown above is converted, upon being treated with an alkyl halide in a known manner, to a quaternary amine salt

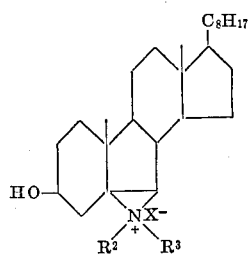

where $R^2$ and $R^3$ are both lower alkyl radicals, which may be the same or different, and $X^-$ is a halide anion, which can be replaced by others such as the sulfate or nitrate anions, X being therefore defined more broadly as the conjugate base of a strong inorganic acid.

Further, the 3-carbon in the steroids of this invention may bear either a hydroxyl group or an ester group in which the acyl radical is that of a lower alkanoic acid such as formic, acetic, propionic, butyric, isobutyric, valeric or caproic acid. The acetates are the preferred esters. In the case of the N-cyano compounds, these ester groups may be present in the starting material, i.e., the B-nor-cholestene derivative; they may also be introduced subsequently, by known esterification procedures, in any of the 6-aza-5,7-cyclocholestan-3β-ols. In the case of 6-aza-5,7-cyclocholestan-3β-ol itself, however, esterification will normally require that the NH group at the 6-position be first protected, for example, by benzylation, after which the benzyl group can be removed by catalytic hydrogenation.

The steroids of this invention can be purified, when necessary, by the usual crystallization methods from appropriate solvents or by chromatographic methods, preferably over alumina.

Cyanogen azide is prepared by reacting a cyanogen halide, preferably cyanogen chloride, with a metal, ammonium or organoammonium azide, preferably sodium azide, under anhydrous conditions, at a temperature in the range of $-50°$ C. to $+25°$ C. Caution is indicated since cyanogen azide is a colorless, unstable liquid which, when isolated, is explosively sensitive to heat or shock. However, its solutions in organic solvents are not explosive and can be stored, handled and used with safety. A typical preparation is described by Marsh and Hermes in J. Am. Chem. Soc. 86, 4506 (1964).

In the present description, the products of the invention have been represented by structural formulas which are noncommittal with respect to the spatial configuration of the B ring, in that the 5,6; 6,7; and 5,7 bonds are represented with solid lines. This is because this configuration has not been definitely established. However, molecular rotation data indicate that the 5,6 and 6,7 bonds are probably of the alpha configuration.

The following examples illustrate the invention.

EXAMPLE 1

*N-cyano-6-aza-5,7-cyclocholestan-3β-ol acetate*

B-nor-cholesteryl acetate, M.P. 85.5–81.5° C., was prepared from cholesteryl acetate using the synthetic sequence of Dauben and Fonken (loc. cit.).

A mixture of 5.57 g. (15 millimoles) of B-nor-cholesteryl acetate and 7.15 ml. (20 millimoles) of 2.80 M cyanogen azide in 75 ml. of ethyl acetate was heated at 52° C. for 24 hours, during which time a total of 425 ml. (87% of theory) of gas was evolved. Evaporation of the clear yellow solution to dryness gave an amorphous yellow solid which was dissolved in 10 ml. of benzene. The solution was applied to a column containing 180 g. of neutral alumina (activity III). Elution of the column with mixtures of petroleum ether, benzene and diethyl ether gave in the benzene-petroleum ether (1:1) fractions crude N - cyano - 6 - aza-5,7-cyclocholestan-3β-ol acetate. After crystallization from hexane there was obtained 3.3 g. (53% yield) of product melting at 148–149° C., $[a]_D^{23}$ $-24°$ (CHCl$_3$, c.=2.0).

*Analysis.*—Calcd. for $C_{29}H_{46}N_2O_2$: C, 76.60; H, 10.20; N, 6.16. Found: C, 76.61; H, 10.09; N, 6.22.

Infrared: $\lambda_{max.}^{Nujol}$ 4.55μ (C≡N), 5.75μ (C≡O), 8.10μ (acetate)

EXAMPLE 2

*N-cyano-6-aza-5,7-cyclocholestan-3β-ol*

A solution of 7.44 g. (20 mmoles) of B-nor-cholesterol in 150 ml. of purified ethyl acetate together with 14.5 ml. of 2.8 M cyanogen azide was heated at 50±2° for 24 hours, during which time a total of 885 ml. of gas was evolved. Evaporation of the reaction mixture to dryness in vacuo gave an orange gum which was applied as a solution in benzene to a column of 240 g. of neutral alumina (activity III). Elution first with benzene-petroleum ether (3:1) and then with benzene-ether (1:1) gave in the latter eluate 3.4 g. of crude N-cyano-6-aza-5,7-cyclocholestan-3β-ol. The product was purified by crystallization from cyclohexane-petroleum ether, giving needles weighing 2.75 g. (38% yield), M.P. 144.5–145.0° C., $[a]_D^{23}$ $-36°$ (CHCl$_3$, c.=1.0).

*Analysis.*—Calcd. for $C_{27}H_{44}N_2O$: C, 78.58; H, 10.75; N, 6.79. Found: C, 78.66; H, 10.72; N, 6.97.

Infrared: $\lambda_{max.}^{CHCl_3}$ 2.94μ (OH), 4.54 (C≡N)

EXAMPLE 3

*6-aza-5,7-cyclocholestan-3β-ol*

To a solution of 0.50 g. of lithium aluminum hydride in 50 ml. of diethyl ether was added 0.83 g. (2 mmoles) of N-cyano-6-aza-5,7-cyclocholestan-3β-ol. The mixture was heated at reflux temperature for 18 hours, cooled, and treated cautiously with excess saturated sodium sulfate in water. Filtration of the product and evaporation of the combined filtrate, after washing the filter cake with ether, gave 0.80 g. of a colorless glass. Chromatography on 40 g. of basic alumina (activity III) gave in the benzene-ether (1:1) eluate 0.38 g. (76% yield) of 6-aza-5,7-cyclocholestan-3β-ol which, after crystallization from ethyl acetate, melted at 142.0–142.5° C., $[a]_D^{23}$ $-30°$ (CHCl$_3$, c.=1.5).

*Analysis.*—Calcd. for $C_{26}H_{45}NO$: C, 80.56; H, 11.70; N, 3.61. Found: C, 80.38; H, 12.09; N, 3.33.

Infrared: $\lambda_{max.}^{CHCl_3}$ 2.77μ sharp, 312μ broad (OH), 3.0μ inflection (NH)

EXAMPLE 4

*6-aza-5,7-cyclocholestan-3β-ol methiodide*

A solution of 100 mg. of 6-aza-5,7-cyclocholestan-3β-ol and 5 ml. of methyl iodide in 10 ml. of hexane was heated at reflux temperature for 3.5 hours. Two days later the white, solid quaternary salt was collected by filtration and weighed 125 mg. (91% yield); M.P. 180.0–180.5° C. dec. An alcoholic solution of the salt on treatment with silver nitrate rapidly gave a precipitate of silver iodide.

*Analysis.*—Calcd. for $C_{27}H_{48}INO$: C, 61.1; H, 9.14; N, 2.65. Found: C, 61.24; H, 8.75; N, 2.54.

Infrared: $\lambda_{max.}^{Nujo}$ 2.94, 3.03$\mu$ (OH and NH)

EXAMPLE 5

*N-methyl-6-aza-5,7-cyclocholestan-3β-ol*

A mixture of 228 mg. of the methiodide of 6-aza-5,7-cyclocholestan-3β-ol and 500 mg. of powdered sodium carbonate in 10 ml. of acetone was stirred at room temperature in a stoppered flask for 22 hours and then centrifuged. The supernatant acetone layer was decanted from insoluble matter and the latter was washed with fresh acetone. Concentration of the combined acetone solutions to about 1 ml. and cooling in ice gave 150 mg. of white crystalline N-methyl-6-aza-5,7-cyclocholestan-3β-ol, M.P. 139° C.; mixed M.P. with 6-aza-5,7-cyclocholestan-3β-ol, 113–118° C.

*Analysis.*—Calcd. for $C_{27}H_{47}NO$: C, 80.73; H, 11.80. Found: C, 80.35; H, 11.57.

EXAMPLE 6

Another preparation of N-methyl-6-aza-5,7-cyclocholestan-3β-ol under conditions somewhat different from those of Example 5 gave a product of high purity.

A suspension of 1.0 g. of the methiodide of 6-aza-5,7-cyclocholestan-3β-ol and 5 g. of sodium carbonate in 100 ml. of acetone was stirred at room temperature for about 30 hours. Filtration of the reaction mixture and evaporation of the filtrate gave a white solid which, on crystallization from about 1 ml. of acetone, melted in part at 135° C. but incompletely up to 235° C. A solution of this crude product in methanol was applied to a column of basic alumina (activity III). Elution with benzene-petroleum ether (1:1) gave 0.86 g. of N-methyl-6-aza-5,7-cyclocholestan-3β-ol, M.P. 136–137° C. after recrystallization from acetone.

*Analysis.*—Calcd. for $C_{27}H_{47}NO$: C, 80.73; H, 11.80; N, 3.49. Found: C, 80.56; H, 11.67; N, 3.60.

The 6-aza-5,7-cyclocholestane derivatives of this invention are active foliar fungicides, showing effective control of plant diseases such as apple scab and cucumber powdery mildew when applied to the plants as conventional spray compositions containing as little as 0.01% of the active ingredient.

Since obvious modifications and equivalents will be evident to those skilled in the chemical arts, I propose to be bound solely by the appended claims.

The embodiments of the invention in which an exclusive property or privilege is claimed are defined as follows:

1. A compound of the group consisting of

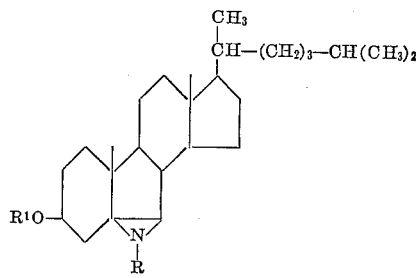

and

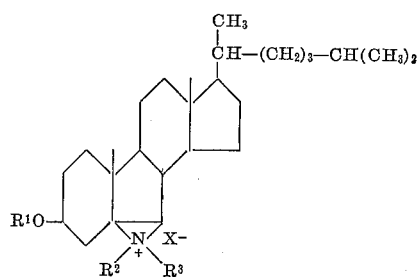

wherein:

R is selected from the group consisting of hydrogen lower alkyl and cyano;
$R^1$ is selected from the group consisting of hydrogen and acyl radicals of lower alkanoic acids;
$R^2$ is lower alkyl;
$R^3$ is selected from the group consisting of hydrogen and lower alkyl; and
X is the conjugate base of a strong inorganic acid.

2. N-cyano-6-aza-5,7-cyclocholestan-3β-ol.
3. N-cyano-6-aza-5,7-cyclocholestan-3β-ol acetate.
4. 6-aza-5,7-cyclocholestan-3β-ol.
5. 6-aza-5,7-cyclocholestan-3β-ol methiodide.
6. N-methyl-6-aza-5,7-cyclocholestan-3β-ol.

No references cited.

ALTON D. ROLLINS, *Primary Examiner.*